(12) United States Patent
Hu et al.

(10) Patent No.: US 11,606,053 B2
(45) Date of Patent: Mar. 14, 2023

(54) INITIAL POSITION DETECTION OF AN ELECTRIC MOTOR

(71) Applicant: NXP USA, Inc., Austin, TX (US)

(72) Inventors: Jianqiu Hu, LiJia (CN); Huabiao Tang, Pudong New Dist. (CN)

(73) Assignee: NXP USA, Inc., Austin, TX (US)

( * ) Notice: Subject to any disclaimer, the term of this patent is extended or adjusted under 35 U.S.C. 154(b) by 64 days.

(21) Appl. No.: 17/445,343

(22) Filed: Aug. 18, 2021

(65) Prior Publication Data

US 2022/0060130 A1 Feb. 24, 2022

(30) Foreign Application Priority Data

Aug. 20, 2020 (CN) .......................... 202010842508.1

(51) Int. Cl.
*H02P 21/18* (2016.01)

(52) U.S. Cl.
CPC ................................... *H02P 21/18* (2016.02)

(58) Field of Classification Search
CPC .. H02P 21/18; H02P 6/188; H02P 6/20; H02P 21/32; H02P 6/185; H02P 2203/03
See application file for complete search history.

(56) References Cited

U.S. PATENT DOCUMENTS

| 9,397,595 | B2 | 7/2016 | Halkosaari et al. |
| 9,952,259 | B2 | 4/2018 | Li |
| 2015/0171781 | A1* | 6/2015 | Halkosaari .............. H02P 21/32 |
| | | | 318/400.33 |
| 2018/0167009 | A1* | 6/2018 | Suzuki ...................... H02P 6/17 |

OTHER PUBLICATIONS

Champa et al., "Initial Rotor Position Estimation for Sensorless Brushless DC Drives," IEEE Transactions on Industry Applications, vol. 45, No. 4, Jul./Aug. 2009, pp. 1318-1324; 7 pages.
Istvan et al., "A Novel Initial Rotor-Position Estimation Method for BLDC Motors Based on Four Voltage Pulses," 12th International Conference on Optimization of Electrical and Electronic Equipment, OPTIM 2010, pp. 512-519; 8 pages.

* cited by examiner

*Primary Examiner* — Muhammad S Islam
*Assistant Examiner* — Bradley R Brown

(57) ABSTRACT

A method for initial position detection of an electric motor includes determining a delta voltage for each of three pairs of stator windings by sequentially energizing and deenergizing each pair. The delta voltage is measured through a non-energized stator winding connected to a center tap of each respective pair. A minimum delta voltage is determined from an absolute value of a minimum of the three delta voltages. The minimum delta voltage is associated with a remaining stator winding not included in the respective pair. The two delta voltages not associated with the minimum delta voltage are compared to determine the proximity of the remaining stator winding to one of a D-axis of a rotor of the electric motor and a Q-axis of the rotor.

20 Claims, 8 Drawing Sheets

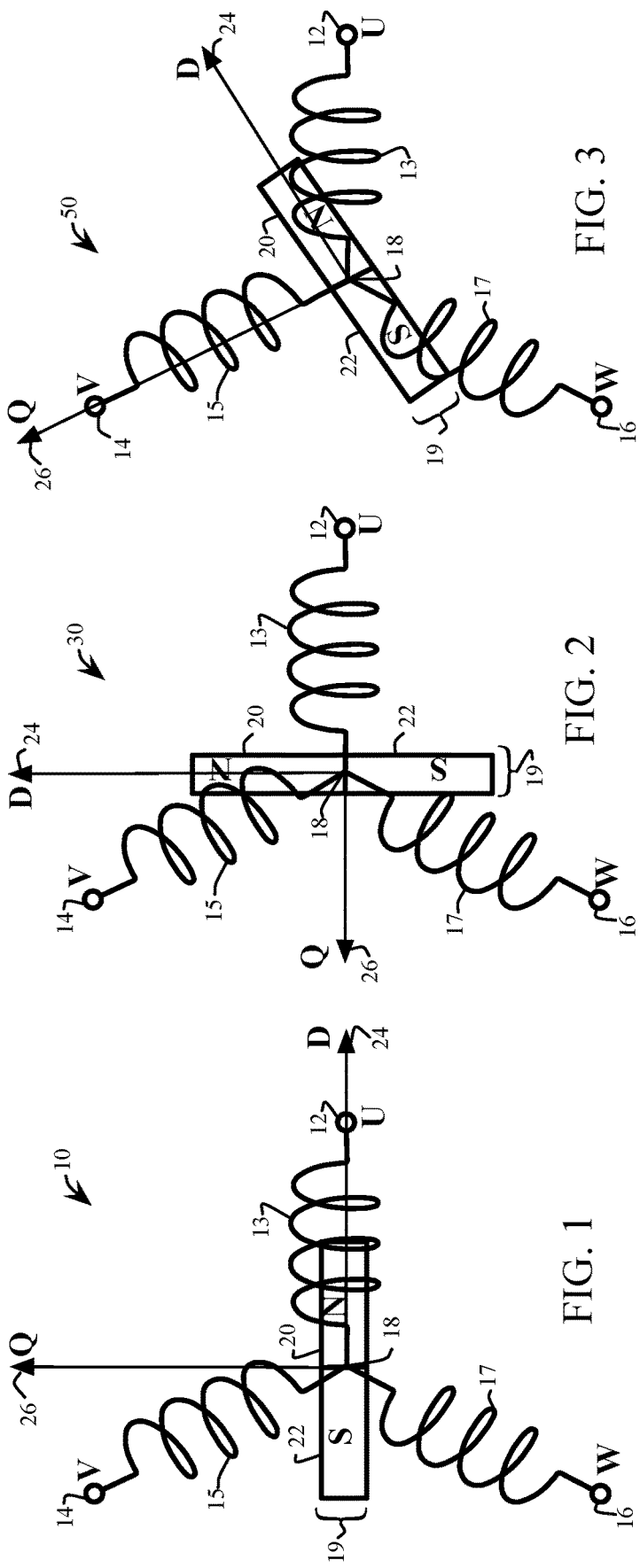

| 1st group pulse | | | 2nd group pulse | | | Position | |
|---|---|---|---|---|---|---|---|
| Δmin | Compare | | Pulse Path | Compare | Angle Range | Angle |
| \|ΔU\| | ΔV > ΔW | | ΔW1: U-V<br>ΔW2: V-U | \|ΔW1\| > \|ΔW2\| | $-15° < \Theta \leq 15°$ | $0°$ |
| | | | | \|ΔW1\| < \|ΔW2\| | $165° < \Theta < 180°$<br>$-180° < \Theta \leq -165°$ | $180°$ |
| | ΔV < ΔW | | | \|ΔW1\| < \|ΔW2\| | $75° < \Theta \leq 105°$ | $90°$ |
| | | | | \|ΔW1\| > \|ΔW2\| | $-105° < \Theta \leq -75°$ | $-90°$ |
| \|ΔV\| | ΔU < ΔW | | ΔU1: V-W<br>ΔU2: W-V | \|ΔU1\| > \|ΔU2\| | $105° < \Theta \leq 135°$ | $120°$ |
| | | | | \|ΔU1\| < \|ΔU2\| | $-75° < \Theta \leq -45°$ | $-60°$ |
| | ΔU > ΔW | | | \|ΔU1\| > \|ΔU2\| | $15° < \Theta \leq 45°$ | $30°$ |
| | | | | \|ΔU1\| < \|ΔU2\| | $-165° < \Theta \leq -135°$ | $-150°$ |
| \|ΔW\| | ΔU > ΔV | | ΔV1: W-U<br>ΔV2: U-W | \|ΔV1\| < \|ΔV2\| | $45° < \Theta \leq 75°$ | $60°$ |
| | | | | \|ΔV1\| > \|ΔV2\| | $-135° < \Theta \leq -105°$ | $-120°$ |
| | ΔU < ΔV | | | \|ΔV1\| > \|ΔV2\| | $135° < \Theta \leq 165°$ | $150°$ |
| | | | | \|ΔV1\| < \|ΔV2\| | $-45° < \Theta \leq -15°$ | $-30°$ |

INITIAL POSITION DETECTION OF AN ELECTRIC MOTOR

FIELD

This disclosure relates generally to electric motors, and more specifically to determining a rotor position and polarity prior to starting the electric motor.

BACKGROUND

A Permanent Magnet Synchronous Motor (PMSM) will typically have a rotor alignment process prior to starting. Without rotor alignment, a PMSM may temporarily reverse direction or mechanically vibrate during operational startup, which is not allowed in many actuator or electric vehicle applications. Traditionally, rotor position has been detected using sensors including hall devices, optical encoders and inductive encoders. The use of sensors to detect rotor position increasing system complexity and reduces reliability due to the potential for additional component failure.

Recent sensorless systems to detect rotor position have relied upon time consuming current measurements, precise sampling of stator inductor voltages, and/or sampling of time-variant bus voltages. Each of these approaches reduces the reliability of rotor position detection, increases cost, complexity, and in some cases, startup time of the electric motor. Additionally, traditional techniques to determine rotor position have resulted in less accuracy of estimated rotor position.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1, FIG. 2 and FIG. 3 are schematic views of an example embodiment showing various physical relationships between a stator self-induction and a rotor permanent magnet position for an initial determination of rotor position.

FIG. 10 is tabular view further showing the determination of the rotor positions of FIG. 8 and FIG. 9, in accordance with an example embodiment of the present disclosure.

DETAILED DESCRIPTION

Figure 4:
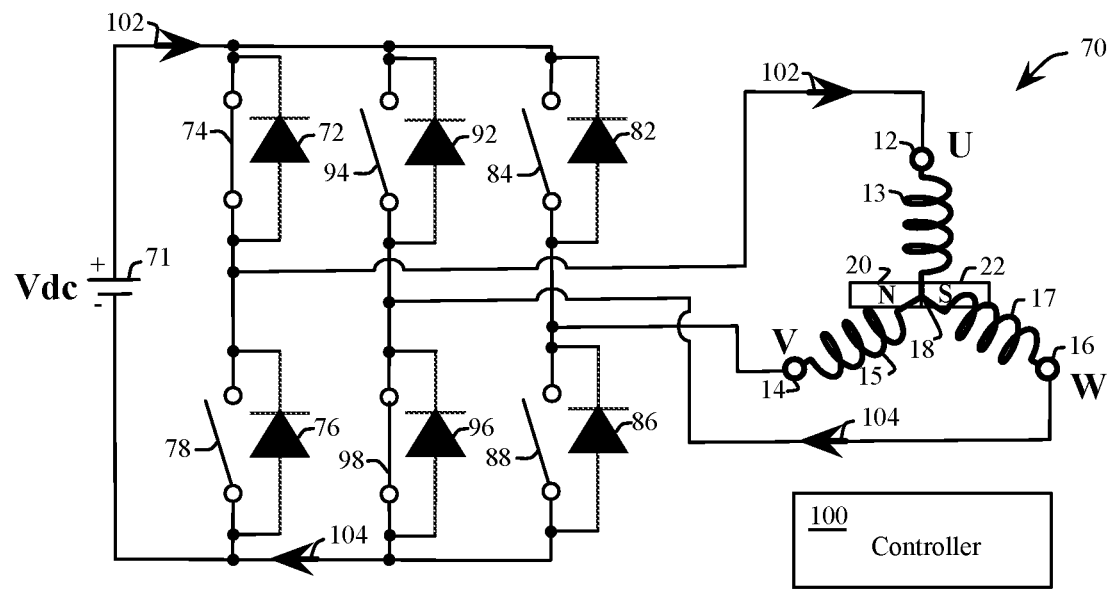
FIG. 4 and FIG. 5 are schematic views of an electric motor configured to during a pulse injection interval and a freewheeling interval respectively, in accordance with an example embodiment of the present disclosure.

Embodiments described herein provide for the detection of a position and polarity of a rotor to facilitate startup of an electric motor. Three short pulses are sequentially injected in each pair of three stator windings with measurements made during the pulse injection interval and during a "freewheeling" interval. The freewheeling interval occurs when the injected voltage pulse is removed and the stator develops a back Electro Motive Force (EMF) as the stator inductor deenergizes. A relative voltage measurement is made for each pair of stator windings by subtracting the freewheeling voltage from the injected voltage during pulse injection. In one embodiment, the difference in voltage for each pair of inductors is measured through a floating phase (e.g., the remaining inductor not forming the inductor pair), to determine a center tap voltage. The value of the center tap voltages relates to the ability of the stator inductors to create and release magnetic field energy which further relates to the stator inductance. The stator inductance changes with the stator inductors position relative to the rotor, hence is usable to determine a pair of diametrically opposed rotor positions.

The polarity of the rotor is further determined by applying two longer voltage pulses on a stator pair that includes a stator winding proximal to the rotor and comparing measurements made during the injection interval and the freewheeling interval, wherein each voltage pulse is applied in opposing polarity to the stator pair. The long pulses are designed to magnetically saturate the rotor core without causing physical rotation of the rotor. By using the nonlinear magnetic saturation phenomenon of the rotor core, the two measured voltages for each applied pulse will either increase or decrease depending upon the rotor polarity. Accordingly, the rotor position and polarity are determined with very little applied energy, less noise, improved reliability, robustness and accuracy in addition to other advantages. Specifically, relative voltage measurements are made at the center tap terminals of each inductor to reduce errors due to bus voltage variation, to improve data resolution and improve reliability. The voltage measurement time is shorter than the time required to perform current measurements, as used in previous solutions. The execution time for calculating rotor position is very short, which is important for automotive applications. The noise generated during electric motor startup is also very small due to the reduction in injected energy into the inductors.

FIG. 1, FIG. 2 and FIG. 3 show example embodiments of physical relationships between stator self inductance and rotor positions. For simplicity, the mutual inductance of the stator windings need not be analyzed because the induced voltages due to the mutual inductance do not vary significantly. Due to magnetic saliency, the size of each stator inductance is related to the magnetic resistance in the magnetic circuit formed by the stator and rotor. A larger magnetic reluctance (e.g., magnetic resistance), reduces the inductance value. Similarly, a smaller magnetic reluctance of the stator winding increases the self inductance of the stator winding. Magnetic reluctance represents the opposition to magnetic flux. Hence when a rotor aligns with a stator winding, magnetic flux flows more easily resulting in an increased magnetic reluctance and thus a reduction in self-inductance.

FIG. 1 shows an embodiment 10 of a three-phase electric motor including a U-Phase terminal 12 of a U-Phase stator winding 13, a V-Phase terminal 14 of a V-Phase stator winding 15 and a W-Phase terminal 16 of a W-Phase stator winding 17. A neutral node 18 (or "center tap") connects each of the three stator windings. A rotor 19 includes a North pole 20 and a South pole 22. A Direct (D)-axis 24 defines a path of maximum reluctance of the rotor. A Quadrature (Q)-axis 26 define a path of maximum generated torque. In FIG. 1, the inductance (Lu) of the U-Phase stator winding 13 is less than the inductance (Lv) of the V-Phase stator winding 15. The inductance Lv is equal to the inductance (Lw) of the W-Phase stator winding 17. Comparing the example embodiment 10 of FIG. 1, with the example embodiment 30 of FIG. 2 and the example embodiment 50 of FIG. 3, the Lu inductance of FIG. 2 is greater than the Lu inductance of FIG. 3, which in turn is greater than the Lu inductance of FIG. 1. Restated, the Lu inductance of the U-Phase stator winding 13 is minimum in FIG. 1 and maximum in FIG. 2, due to the different rotor positions.

Figure 5:
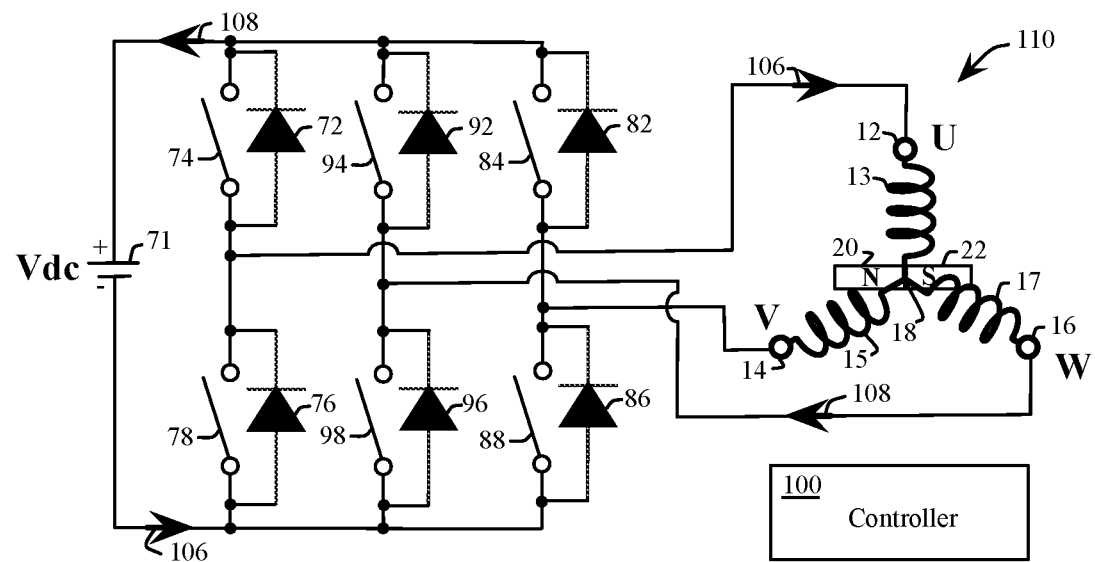

FIG. 4 and FIG. 5 shows example embodiments 70 and 110 of an electric motor for a pulse injection interval and a freewheeling interval respectively. In the embodiment 70 of FIG. 4 a positive terminal of the voltage supply 71 is connected to the U-Phase terminal 12 through a diode 72, shortable by a switch 74. The negative terminal of the voltage supply 71 is connected to the U-Phase terminal 12 through a diode 76, shortable by a switch 78. The positive terminal of the voltage supply 71 is connected to the V-Phase terminal 14 through a diode 82, shortable by a switch 84. The negative terminal of the voltage supply 71 is connected to the V-Phase terminal 14 through a diode 86, shortable by a switch 88. The positive terminal of the voltage supply 71 is connected to the W-Phase terminal 16 through a diode 92, shortable by a switch 94. The negative terminal of the voltage supply 71 is connected to the W-Phase terminal 16 through a diode 96, shortable by a switch 98. Each of the example embodiments 70 and 110 include a Controller 100. In one example embodiment, the Controller 100 includes a combination of one or more of state machines, machine code and/or firmware, configured to control the switches 74, 78, 94, 98, 84 and 88.

In the example embodiment 70, a pair of stator windings includes the U-Phase stator winding 13 and the W-Phase stator winding 17. During a pulse injection interval, the Controller 100 shorts the diode 72 with the switch 74 and the diode 96 with the switch 98. Accordingly, a current 102 flows from the positive terminal of the voltage supply (V dc) 71 through the switch 74, and through the U-Phase stator winding 13. A current 104 flows though the W-Phase stator winding 17, and the switch 98 to the negative terminal of the voltage supply 71. Accordingly, the pair of stator windings formed by the U-Phase stator winding 13 and the W-Phase stator winding 17 is energized. With U-Phase terminal 12 connected to the positive terminal of the voltage supply 71 and the W-Phase terminal 16 connected to the negative terminal of the voltage supply 71, the voltage applied to the pair of stator windings (e.g., the "motor stator") is Uuw. The voltage as measured through the floating V-Phase stator winding 14 at the V-Phase terminal 14 is substantially the same as the voltage at the neutral node 18. The voltage Vv1 of the neutral node 18 after this pulse injection interval is given by the following equation, wherein Lw and Lu are the inductances of the W-Phase and U-Phase stator windings 17 and 13 respectively:

$$Vv1=[Lw/(Lu+Lw)]*Vdc \quad (1)$$

In the example embodiment 110, a pair of stator windings includes the U-Phase stator winding 13 and the W-Phase stator winding 17. During a freewheeling interval, the Controller 100 opens the switch 74 and the switch 98. Accordingly, a current 106 flows from the negative terminal of the voltage supply 71 through the diode 76, and through the U-Phase stator winding 13. A current 108 flows though the W-Phase stator winding 17, and the diode 92 to the positive terminal of the voltage supply 71. Accordingly, the pair of stator windings formed by the U-Phase stator winding 13 and the W-Phase stator winding 17 is deenergized, resulting in a back EMF to produce the currents 106 and 108. The voltage Vv2 of the neutral node 18 after this pulse injection interval is given by the following equation:

$$Vv2=[Lu/(Lu+Lw)]*Vdc \quad (2)$$

Accordingly, the delta voltage across the pair of stator windings is given by:

$$\Delta Vv=Vv2-Vv1 \quad (3)$$

The process of energizing and energizing each of the pairs of stator windings, as described for the stator pair formed by the U-Phase stator winding 13 and the W-Phase stator winding 17 to determine $\Delta Vv$, is repeated with the remaining stator pairs to generate $\Delta Vu$ and $\Delta Vw$. Specifically, $\Delta Vu$ is generated from measurements of the pulse injection interval and freewheeling interval using a voltage pulse Uvw across the V-Phase stator winding 15 and the W-Phase stator winding 17. $\Delta Vw$ is generated from measurements of the pulse injection interval and freewheeling interval using a voltage pulse Uuv across the U-Phase stator winding 13 and the V-Phase stator winding 15.

A minimum delta voltage is then determined from a minimum of an absolute value of each of the respective stator delta voltages $\Delta Vu$, $\Delta Vv$ and $\Delta Vw$ as given by the equation:

$$\Delta Vmin=min(|\Delta Vu|,|\Delta Vv|,|\Delta Vw|) \quad (3)$$

As shown in FIG. 1 and FIG. 2, when $\Delta Vmin=|\Delta Vu|$ the U-Phase stator winding 13 is aligned closest to the D-axis 24 or the Q-axis 26, as compared to the remaining two stator windings 15 and 17. Conversely, if $\Delta Vmin=|\Delta Vv|$ the V-Phase stator winding 15 is aligned closest to the D-axis 24 or the Q-axis 26, and if $\Delta Vmin=|\Delta Vw|$ the W-Phase stator winding 17 is aligned closest to the D-axis 24 or the Q-axis 26.

To distinguish whether the stator winding associated with $\Delta Vmin$, is closest to the D-axis 24 or the Q-axis 26, two of the previously determined delta voltages determined from each pair of stator windings including the stator winding associated with $\Delta Vmin$ is used. For example, when $\Delta Vmin=|\Delta Vu|$, the U-Phase stator winding 13 proximity to the D-axis 24 or the Q-axis 26 is analyzed with $\Delta Vv$ (determined from Uuw) and from $\Delta Vw$ (determined from Uuv). Specifically, when $\Delta Vv$ is greater than $\Delta Vw$, then the U-Phase stator winding 13 is proximal to the D-axis 24. When $\Delta Vv$ is less than or equal to $\Delta Vw$, then the U-Phase stator winding 13 is proximal to the Q-axis 26. In another embodiment, a single ended measurement is used, wherein if $\Delta Vw$ is greater than zero, then the U-Phase stator winding 13 is proximal to the Q-axis 26, otherwise the U-Phase stator winding 13 is proximal to the D-axis 24.

Figure 7:
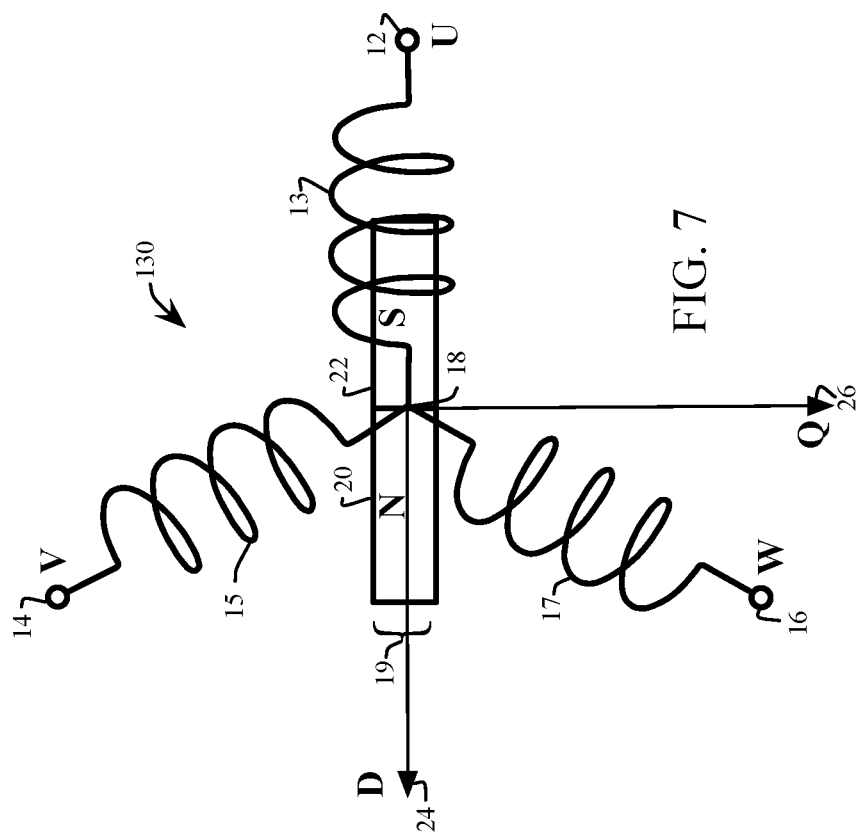
FIG. 6 and FIG. 7 are schematic views of an example embodiment showing two physical relationships between a stator self-induction and a rotor permanent magnet position for a determination of rotor polarity.
Figure 6:
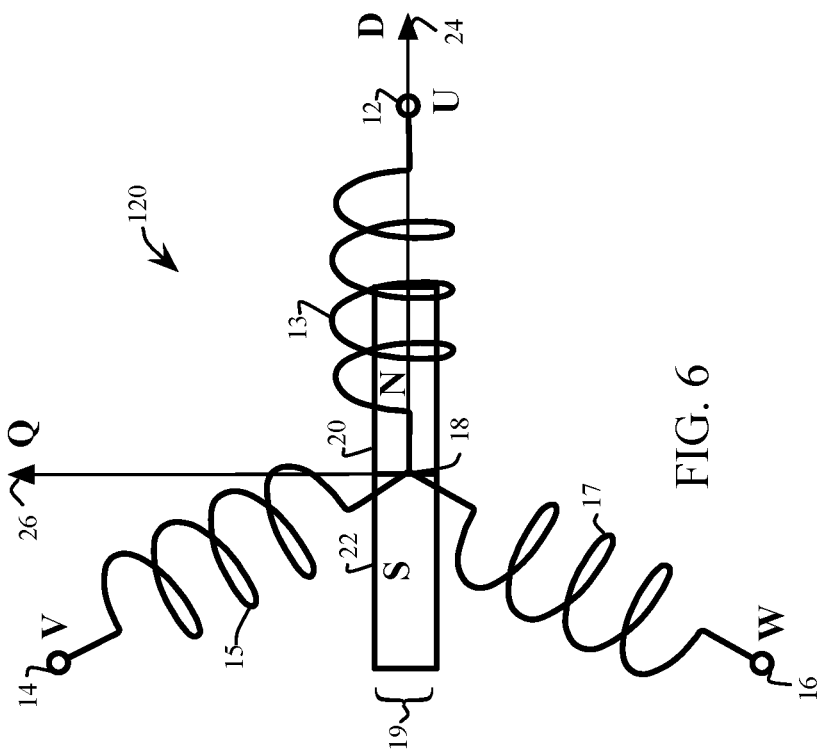

Once the proximity of the stator winding (associated with $\Delta Vmin$) to an axis is determined, the polarity of the rotor 19 aligned to the stator winding is determined. An example embodiment 120 of FIG. 6 shows a North pole 20 of the rotor 19 being aligned with the U-Phase stator winding 13. In contrast, the example embodiment 130 of FIG. 7 shows a South pole 22 of the rotor 19 being aligned with the U-Phase stator winding 13. To determine the polarity of the rotor 19, a voltage pulse signal is applied to a pair of stator windings that includes the stator winding associated with A Vmin. For example, with reference to FIG. 6 and FIG. 7, a voltage pulse is applied to either the pair of stators including the U-Phase stator winding 13 and the V-Phase stator winding 15, or to the U-Phase stator winding 13 and the W-Phase stator winding 17.

In one example, a long voltage pulse Uuv is applied to the pair of stator windings including the U-Phase stator winding 13 and the V-Phase stator winding 15, the nonlinear magnetic saturation properties of the stator core are used to determine rotor polarity. The applied long voltage pulse is sufficiently long to ensure that the stator winding (e.g., the U-Phase stator winding 13 in FIG. 6) is magnetically saturated, while being sufficiently short to prevent the rotor 19 from physically rotating. As shown in FIG. 6, when the long Uuv is applied across terminals 12 and 14, the current in the U-Phase stator winding 13 will weaken the influence of the rotor flux on Lu and Lv and thus reduce the values of Lu and Lv. However, the U-Phase stator winding 13 is more likely to magnetically saturate than the V-Phase stator winding 15, hence the equation dLu/di>dLv/di holds. Restated, the inductance Lu of the U-Phase stator winding 13 will decrease more significantly than Lv. Conversely, as shown in FIG. 7, the inductance Lu will increase more significantly than Lv.

The long voltage pulse Uuv is first applied to the pair of stators in a pulse injection interval to determine a Vw1, then to a freewheeling interval to determine a Vw2, and then the difference Vw2−Vw1 determines ΔVw1, similar to the description of FIG. 4 and FIG. 5. The voltage sense is then reversed to apply a long voltage pulse Uvu to determine ΔVw2 in a similar manner to determining ΔVw1. Finally, if |ΔVw1|>|ΔVw2| then the North pole 20 is aligned with the U-Phase stator winding 13, as shown in FIG. 6. Otherwise, the South pole 22 is aligned with the U-Phase stator winding 13, as shown in FIG. 7.

Figure 8:
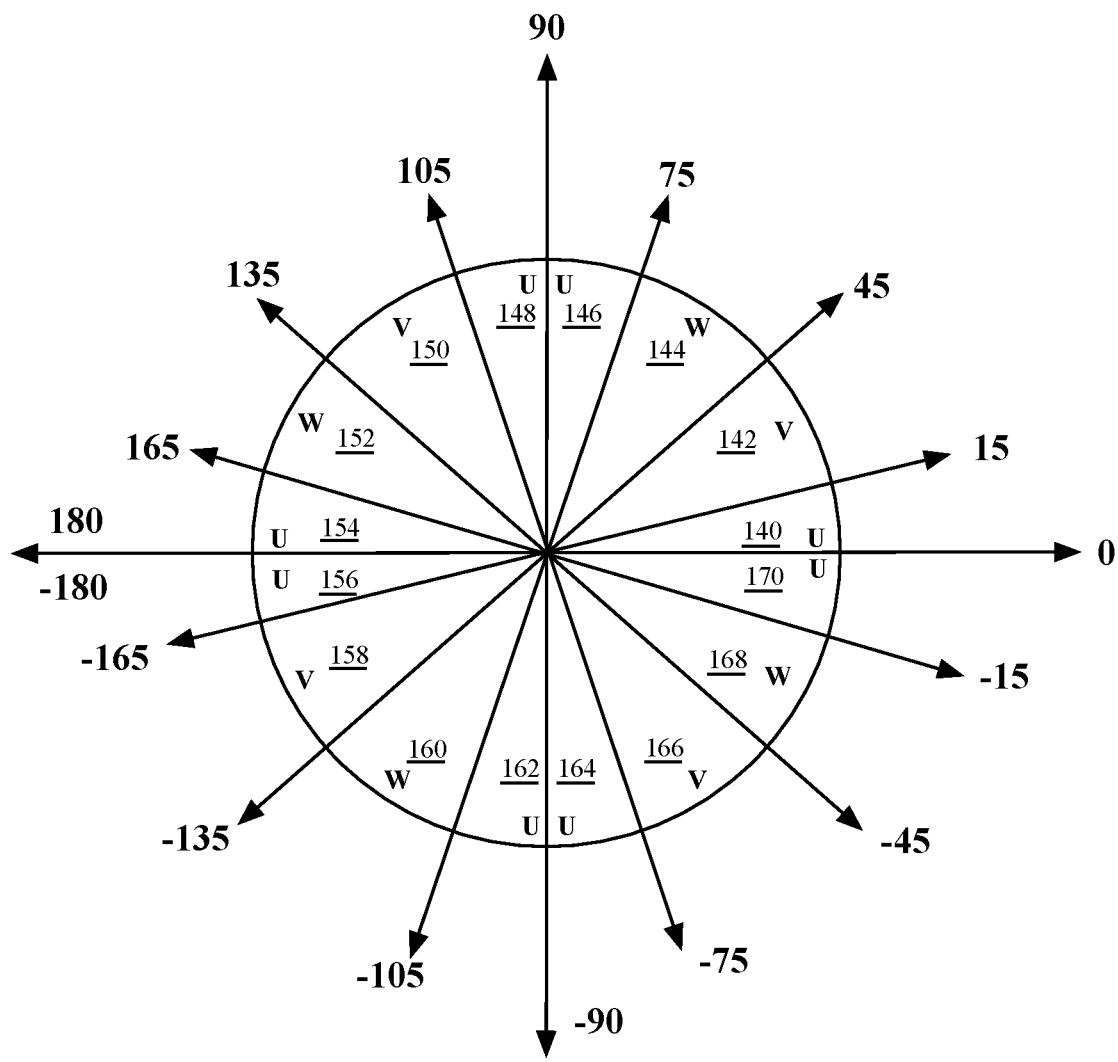
FIG. 8 is a polar diagram showing determined rotor positions, in accordance with an example embodiment of the present disclosure.

FIG. 8 is a polar diagram showing various positions of the rotor 19, in accordance with an example embodiment of the present disclosure. In FIG. 8, the rotor 19 position is resolved within plus or minus 15 degrees, with angular ranges 140, 142, 144, 146, 148, 150, 152, 154, 156, 158, 160, 162, 164, 166, 168 and 170 resolved relative to a reference angle at 0 degrees. With reference to FIG. 6, FIG. 7 and FIG. 8, in one example embodiment, ΔVmin=|ΔVu|. Hence, the rotor 19 is aligned to the U-Phase stator winding 13 either at angular range 140, 170, 154, 156, 148, 146, 162 or 164. After determining that the U-Phase stator winding 13 is proximal to the D-axis 24, the rotor 19 is resolved to align to either 140, 170, 154 or 156. After resolving the polarity direction of the rotor 19, the rotor alignment will correspond to the angular range 140 or 170 in the case of FIG. 6, or 154 or 156 in the case of FIG. 7.

Figure 9:
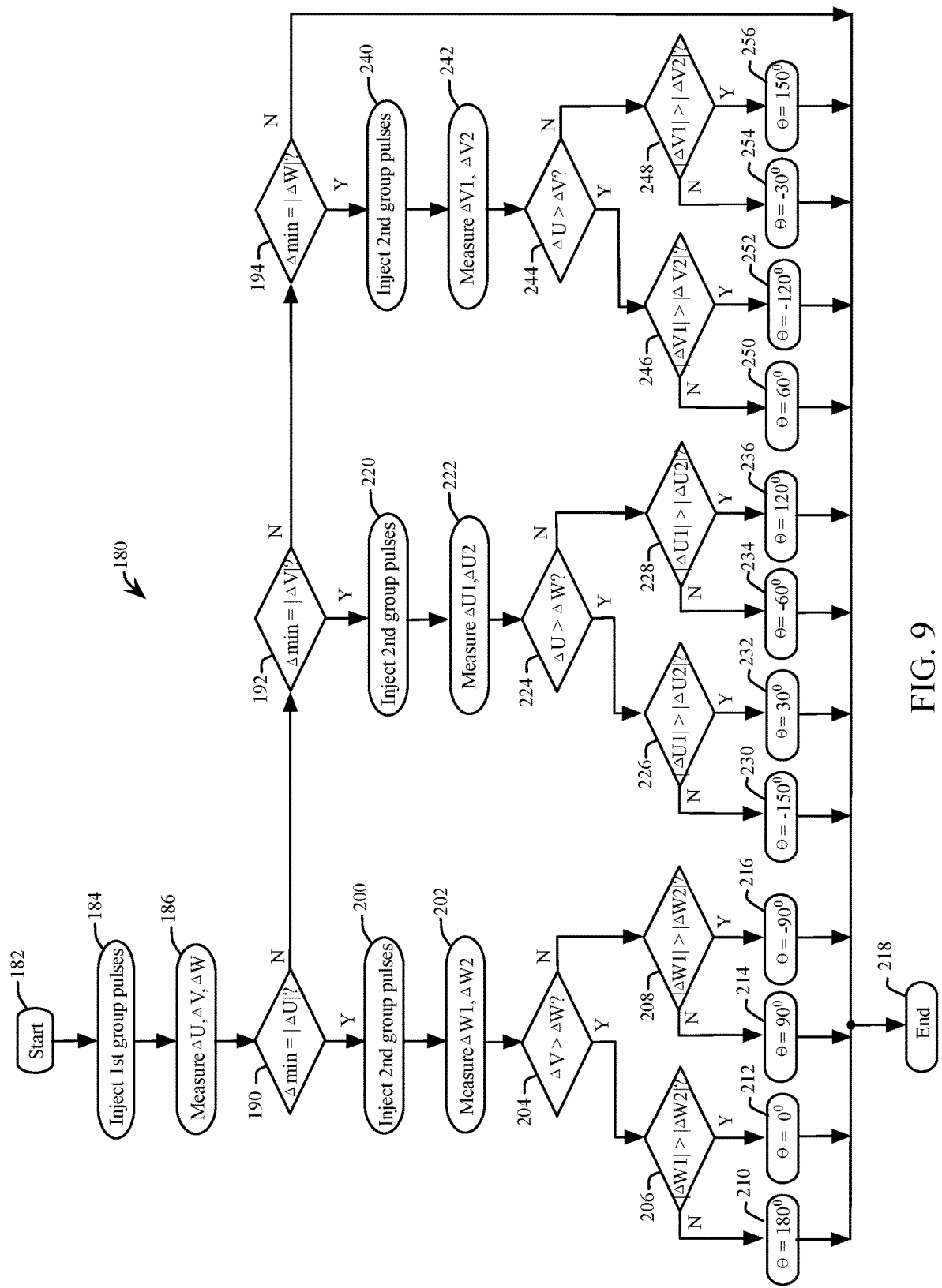
FIG. 9 is a flowchart representation of a method for determining the rotor positions of FIG. 8, in accordance with an example embodiment of the present disclosure.

FIG. 9 is a flowchart representation of a method 180 for determining the rotor positions of FIG. 8, in accordance with an example embodiment of the present disclosure. The method 180 begins at 182. At 184, a first group of voltage pulses are injected across each pair of stator windings in accordance with FIG. 4 and FIG. 5. At 186, values for ΔVu, ΔVv and ΔVw are calculated. At 190, 192, and 194, one of three decision branches are followed depending upon whether ΔVmin=min(|ΔVu|), min(|ΔVv|) or min(|ΔVw|) respectively.

At 190, if ΔVmin=min(|ΔVu|) a second group of long voltage pulses are injected at 200. The long voltage pulses are further described with reference to FIG. 6 and FIG. 7. At 202, values for ΔW1 and ΔW1 are determined. At 204, if ΔV>ΔW then the stator winding associated with ΔVmin is proximal to the D-axis 24, otherwise the winding is proximal to the Q-axis 26. At 206, if |ΔW|>|ΔW2| then the rotor position is 0 degrees at 212 (see 140 or 170 of FIG. 8), else at 210 the rotor position is 180 degrees (see 154 or 156 of FIG. 8). At 208, if |ΔW|>|ΔW2| then the rotor position is −90 degrees at 216 (see 162 or 164 of FIG. 8), else at 214 the rotor position is 90 degrees (see 146 or 148 of FIG. 8).

At 192, if ΔVmin=min(|ΔVv|) a second group of long voltage pulses are injected at 220. The long voltage pulses are further described with reference to FIG. 6 and FIG. 7. At 222, values for ΔU1 and ΔU1 are determined. At 224, if ΔU>ΔW then the stator winding associated with ΔVmin is proximal to the D-axis 24, otherwise the winding is proximal to the Q-axis 26. At 226, if |ΔU1|>|ΔU2| then the rotor position is 30 degrees at 232 (see 142 of FIG. 8), else at 230 the rotor position is −150 degrees (see 158 of FIG. 8). At 228, if |ΔU1|>|ΔU2| then the rotor position is 120 degrees at 236 (see 150 of FIG. 8), else at 234 the rotor position is −60 degrees (see 166 of FIG. 8).

At 194, if ΔVmin=min(|ΔVw|) a second group of long voltage pulses are injected at 240. The long voltage pulses are further described with reference to FIG. 6 and FIG. 7. At 242, values for ΔV1 and ΔV1 are determined. At 244, if ΔU>ΔV then the stator winding associated with ΔVmin is proximal to the D-axis 24, otherwise the winding is proximal to the Q-axis 26. At 246, if |ΔV1|>|ΔV2| then the rotor position is −120 degrees at 252 (see 160 of FIG. 8), else at 250 the rotor position is 60 degrees (see 144 of FIG. 8). At 248, if |ΔV1|>|ΔV2| then the rotor position is 150 degrees at 256 (see 152 of FIG. 8), else at 254 the rotor position is −30 degrees (see 168 of FIG. 8). At 218, the method 180 ends.

Figure 11:
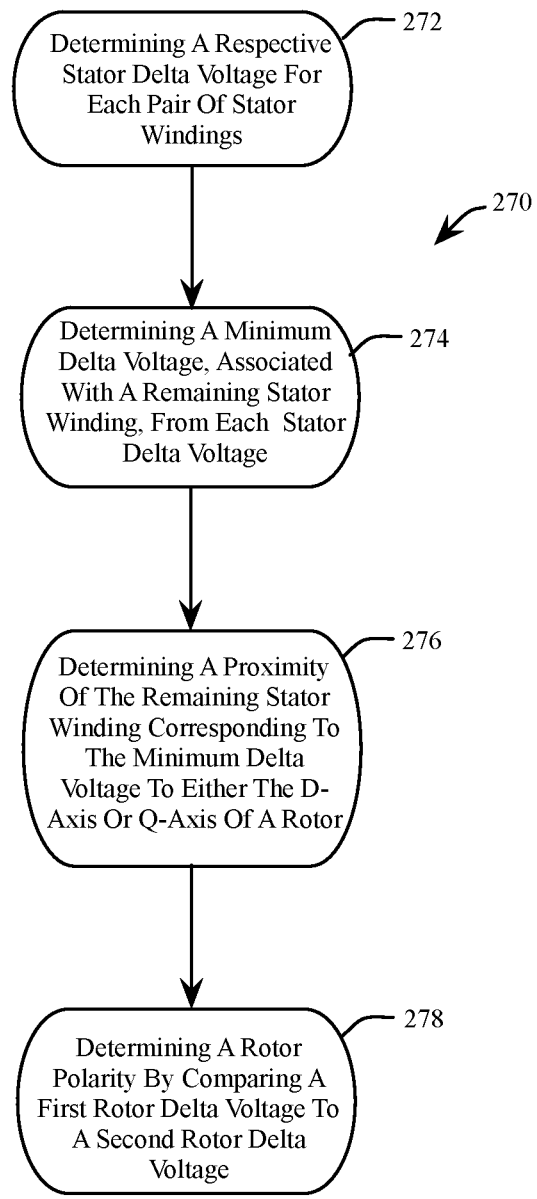
FIG. 11 is a flowchart representation of a method for initial position detection of an electric motor, in accordance with an example embodiment of the present disclosure.

FIG. 10 is tabular view further showing the determination of the rotor positions of FIG. 8 and FIG. 9, in accordance with an example embodiment of the present disclosure. FIG. 11 shows an example embodiment 270 of a method for initial position detection of an electric motor. At 272, a respective stator delta voltage (ΔVu, ΔVv or ΔVw) is determined for each pair of stator windings. At 274, a minimum delta voltage (ΔVmin) associated with a remaining stator winding is determined from each stator delta voltage. At 276, a proximity of the remaining stator winding corresponding to the minimum delta voltage is determined to either the D-axis 24 or the Q-axis 26 of a rotor 19. At 278, a rotor polarity is determined by comparing a first rotor delta voltage to a second rotor delta voltage (e.g., |ΔW1|>|ΔW2|).

Figure 12:
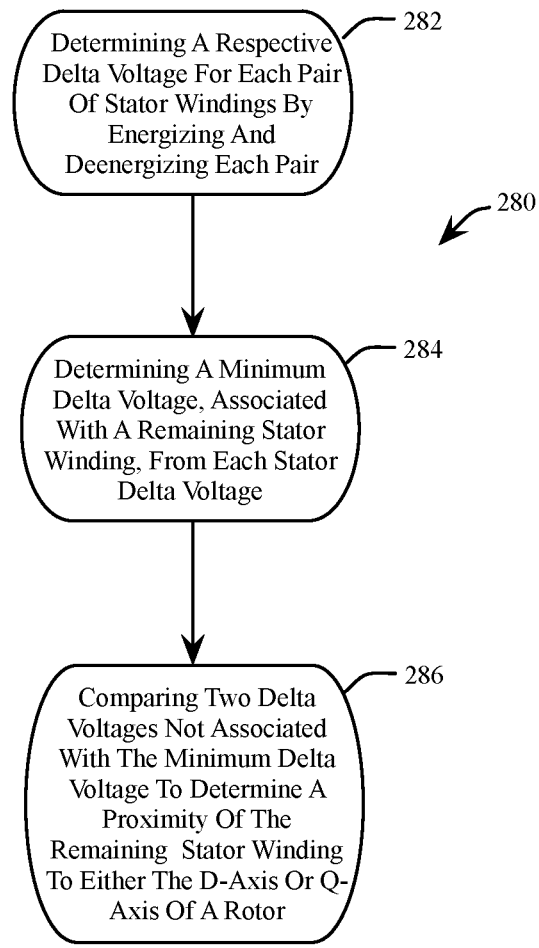
FIG. 12 is a flowchart representation of a method for initial position detection of an electric motor, in accordance with an example embodiment of the present disclosure.

FIG. 12 shows an example embodiment 280 of a method for initial position detection of an electric motor. At 282, a respective delta voltage for each pair of stator windings is determined by energizing (see FIG. 4) and deenergizing (see FIG. 5) each pair. At 284, a minimum delta voltage, associated with a remaining stator winding, is determined from each stator delta voltage. At 286, two delta voltages not associated with the minimum delta voltage are compared to determine a proximity of the remaining stator winding to either the D-axis 24 or the Q-axis 26 of a rotor 19.

As will be appreciated, embodiments as disclosed include at least the following. In one embodiment, a method for initial position detection of an electric motor comprises for each of a respective pair of stator windings selected from two of three stator windings, wherein each of the three stator windings are connected to a neutral node, determining a respective stator delta voltage, each respective stator delta voltage being one of a plurality of delta voltages determined by applying a first voltage pulse across the respective pair while measuring a respective first voltage of the neutral node, applying a discharge path across the respective pair while measuring a respective second voltage of the neutral node, and determining the delta voltage by subtracting the respective first voltage from the respective second voltage. A minimum delta voltage is determined from a minimum of an absolute value of each of the three respective stator delta voltages, the minimum delta voltage associated with a remaining stator winding of the three stator windings not included in the respective pair. A proximity of the remaining stator winding corresponding to the minimum delta voltage to one of a D-axis of a rotor of the electric motor and a Q-axis of the rotor is determined by comparing the stator delta voltages of the two stator windings not associated with the minimum delta voltage. A rotor polarity of the rotor is determined by comparing a first rotor delta voltage to a second rotor delta voltage, wherein the first rotor delta voltage and the second rotor delta voltage are each one of the plurality of delta voltages determined from a pair of stator windings including the remaining stator winding associated with the minimum delta voltage.

Alternative embodiments of the method for initial position detection of an electric motor include one of the following features, or any combination thereof. The first voltage and the second voltage of the neutral node are measured at a terminal of the remaining stator winding connected to the neutral node, wherein the remaining stator winding is non-energized. The first voltage pulse and the second voltage pulse used to determine the rotor polarity have a long duration capable of magnetically saturating the remaining stator winding associated with the minimum delta voltage. The first voltage pulse and the second voltage pulse used to determine the rotor polarity have a short duration capable of preventing physical rotation of the rotor. The minimum absolute voltage corresponds to a U-Phase, the remaining stator winding is proximal to the D-axis when the respective stator delta voltage for a V-phase is greater than the respective stator voltage for a W-phase, and the remaining stator winding is proximal to the Q-axis when the respective stator delta voltage for a V-phase is less than or equal to the respective stator voltage for a W-phase. The minimum absolute voltage corresponds to the U-Phase and the initial position of the rotor is: nominally 0 degrees to a reference angle when a first absolute value of the first rotor delta voltage is greater than a second absolute value of the second rotor delta voltage and the remaining stator winding is proximal to the D-axis; nominally 180 degrees to the reference angle when the first absolute value of the first rotor delta voltage is less than or equal to the second absolute value of the second rotor delta voltage and the remaining stator winding is proximal to the D-axis; nominally −90 degrees to the reference angle when a first absolute value of the first rotor delta voltage is greater than a second absolute value of the second rotor delta voltage and the remaining stator winding is proximal to the Q-axis; and nominally 90 degrees to the reference angle when the first absolute value of the first rotor delta voltage is less than or equal to the second absolute value of the second rotor delta voltage and the remaining stator winding is proximal to the Q-axis. The minimum absolute voltage corresponds to a V-Phase, the remaining stator winding is proximal to the D-axis when the respective stator delta voltage for a U-phase is greater than the respective stator voltage for a W-phase, and the remaining stator winding is proximal to the Q-axis when the respective stator delta voltage for a U-phase is less than or equal to the respective stator voltage for a W-phase. The minimum absolute voltage corresponds to a V-Phase and the initial position of the rotor is: nominally 30 degrees to a reference angle when a first absolute value of the first rotor delta voltage is greater than a second absolute value of the second rotor delta voltage and the remaining stator winding is proximal to the D-axis; nominally −150 degrees to the reference angle when the first absolute value of the first rotor delta voltage is less than or equal to the second absolute value of the second rotor delta voltage and the remaining stator winding is proximal to the D-axis; nominally 120 degrees to the reference angle when a first absolute value of the first rotor delta voltage is greater than a second absolute value of the second rotor delta voltage and the remaining stator winding is proximal to the Q-axis; and nominally −60 degrees to the reference angle when the first absolute value of the first rotor delta voltage is less than or equal to the second absolute value of the second rotor delta voltage and the remaining stator winding is proximal to the Q-axis. The minimum absolute voltage corresponds to a W-Phase, the remaining stator winding is proximal to the D-axis when the respective stator delta voltage for a U-phase is greater than the respective stator voltage for a V-phase, and the remaining stator winding is proximal to the Q-axis when the respective stator delta voltage for a U-phase is less than or equal to the respective stator voltage for a V-phase. The minimum absolute voltage corresponds to a W-Phase and the initial position of the rotor is: nominally −120 degrees to a reference angle when a first absolute value of the first rotor delta voltage is greater than a second absolute value of the second rotor delta voltage and the remaining stator winding is proximal to the D-axis; nominally 60 degrees to the reference angle when the first absolute value of the first rotor delta voltage is less than or equal to the second absolute value of the second rotor delta voltage and the remaining stator winding is proximal to the D-axis; nominally 150 degrees to the reference angle when a first absolute value of the first rotor delta voltage is greater than a second absolute value of the second rotor delta voltage and the remaining stator winding is proximal to the Q-axis; and nominally −30 degrees to the reference angle when the first absolute value of the first rotor delta voltage is less than or equal to the second absolute value of the second rotor delta voltage and the remaining stator winding is proximal to the Q-axis.

In another embodiment, an apparatus comprises a rotor of an electric motor, the rotor comprising a Direct (D)-axis and a Quadrature (Q)-axis, wherein the D-axis defines a first path of maximum reluctance of the rotor and the Q-axis defines a second path of maximum generated torque. The apparatus further comprises a plurality of stator windings of the electric motor, wherein three pairs of stator windings are chosen from the plurality of stator windings. The apparatus further comprises a controller configured to: determine a delta voltage for each pair of stator windings by sequentially energizing and deenergizing each pair, wherein the delta voltage is measured through a non-energized stator winding connected to a center tap of each respective pair; determine a minimum delta voltage from a minimum of an absolute value of each of the three delta voltages, wherein the minimum delta voltage is associated with a remaining stator winding not included in the respective pair; and compare the two delta voltages not associated with the minimum delta voltage to determine the proximity of the remaining stator winding to one of the D-axis of the rotor and a Q-axis of the rotor.

Alternative embodiments of the apparatus include one of the following features, or any combination thereof. The electric motor comprises a Permanent Magnet Synchronous Motor (PMSM). The electric motor comprises a Brush Less Direct Current (BLDC) motor. The controller is further configured to sequentially energize and deenergize a pair of stator windings including the remaining stator winding associated with the minimum delta voltage, to measure a first rotor delta voltage and a second rotor delta voltage, wherein a first rotor delta voltage is measured by applying a first voltage pulse in an opposing direction to a second voltage pulse used to measure a second rotor delta voltage, and determine a rotor polarity of the rotor by comparing the first rotor delta voltage with the second rotor delta voltage. The controller is further configured to energize each pair of stator windings by sequentially connecting each pair to one of a power supply and a ground through a respective shorted diode connection.

In another embodiment, a method for initial position detection of an electric motor comprises determining a delta voltage for each of three pairs of stator windings by sequentially energizing and deenergizing each pair, wherein the delta voltage is measured through a non-energized stator winding connected to a center tap of each respective pair. A minimum delta voltage is determined from a minimum of an absolute value of each of the three delta voltages, wherein the minimum delta voltage is associated with a remaining stator winding not included in the respective pair. The two delta voltages not associated with the minimum delta voltage are compared to determine the proximity of the remaining stator winding to one of a Direct (D)-axis of a rotor of the electric motor and a Quadrature (Q)-axis of the rotor, wherein the D-axis defines a first path of maximum reluctance of the rotor and the Q-axis defines a second path of maximum generated torque.

Alternative embodiments of the method for initial position detection of an electric motor include one of the following features, or any combination thereof. A pair of stator windings, including the remaining stator winding associated with the minimum delta voltage, are sequentially energized and deenergized to measure a first rotor delta voltage and a second rotor delta voltage, wherein a first rotor delta voltage is measured by applying a first voltage pulse in an opposing direction to a second voltage pulse used to measure a second rotor delta voltage, and a rotor polarity of the rotor is determined by comparing the first rotor delta voltage with the second rotor delta voltage, to measure a first rotor delta voltage and a second rotor delta voltage, wherein a first rotor delta voltage is measured by applying a first voltage pulse in an opposing direction to a second voltage pulse used to measure a second rotor delta voltage, and a rotor polarity of the rotor is determined by comparing the first rotor delta voltage with the second rotor delta voltage. The first voltage pulse and the second voltage pulse used to determine the rotor polarity have a long duration capable of magnetically saturating the remaining stator winding associated with the minimum delta voltage. The first voltage pulse and the second voltage pulse used to determine the rotor polarity have a short duration capable of preventing physical rotation of the rotor. Energizing each of the three pairs of stator windings comprises connecting each respective pair to one of a power supply and a ground through a respective shorted diode connection.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for initial position detection of an electric motor comprising:
    for each of a respective pair of stator windings selected from two of three stator windings, wherein each of the three stator windings are connected to a neutral node, determining a respective stator delta voltage, each respective stator delta voltage being one of a plurality of delta voltages determined by applying a first voltage pulse across the respective pair while measuring a respective first voltage of the neutral node, applying a discharge path across the respective pair while measuring a respective second voltage of the neutral node, and determining the delta voltage by subtracting the respective first voltage from the respective second voltage;
    determining a minimum delta voltage from a minimum of an absolute value of each of the three respective stator delta voltages, the minimum delta voltage associated with a remaining stator winding of the three stator windings not included in the respective pair;
    determining a proximity of the remaining stator winding corresponding to the minimum delta voltage to one of a D-axis of a rotor of the electric motor and a Q-axis of the rotor by comparing the stator delta voltages of the two stator windings not associated with the minimum delta voltage; and
    determining a rotor polarity of the rotor by comparing a first rotor delta voltage to a second rotor delta voltage, wherein the first rotor delta voltage and the second rotor delta voltage are each one of the plurality of delta voltages determined from a pair of stator windings including the remaining stator winding associated with the minimum delta voltage.

2. The method of claim 1 wherein the first voltage and the second voltage of the neutral node are measured at a terminal of the remaining stator winding connected to the neutral node, wherein the remaining stator winding is non-energized.

3. The method of claim 1 wherein the first voltage pulse and the second voltage pulse used to determine the rotor polarity have a long duration capable of magnetically saturating the remaining stator winding associated with the minimum delta voltage.

4. The method of claim 1 wherein the first voltage pulse and the second voltage pulse used to determine the rotor polarity have a short duration capable of preventing physical rotation of the rotor.

5. The method of claim 1 wherein the minimum absolute voltage corresponds to a U-Phase, the remaining stator winding is proximal to the D-axis when the respective stator delta voltage for a V-phase is greater than the respective stator voltage for a W-phase, and the remaining stator winding is proximal to the Q-axis when the respective stator delta voltage for a V-phase is less than or equal to the respective stator voltage for a W-phase.

6. The method of claim 5 wherein the initial position of the rotor is:

nominally 0 degrees to a reference angle when a first absolute value of the first rotor delta voltage is greater than a second absolute value of the second rotor delta voltage and the remaining stator winding is proximal to the D-axis, nominally 180 degrees to the reference angle when the first absolute value of the first rotor delta voltage is less than or equal to the second absolute value of the second rotor delta voltage and the remaining stator winding is proximal to the D-axis, nominally −90 degrees to the reference angle when a first absolute value of the first rotor delta voltage is greater than a second absolute value of the second rotor delta voltage and the remaining stator winding is proximal to the Q-axis, and nominally 90 degrees to the reference angle when the first absolute value of the first rotor delta voltage is less than or equal to the second absolute value of the second rotor delta voltage and the remaining stator winding is proximal to the Q-axis.

7. The method of claim 1 wherein the minimum absolute voltage corresponds to a V-Phase, the remaining stator winding is proximal to the D-axis when the respective stator delta voltage for a U-phase is greater than the respective stator voltage for a W-phase, and the remaining stator winding is proximal to the Q-axis when the respective stator delta voltage for a U-phase is less than or equal to the respective stator voltage for a W-phase.

8. The method of claim 7 wherein the initial position of the rotor is:

nominally 30 degrees to a reference angle when a first absolute value of the first rotor delta voltage is greater than a second absolute value of the second rotor delta voltage and the remaining stator winding is proximal to the D-axis, nominally −150 degrees to the reference angle when the first absolute value of the first rotor delta voltage is less than or equal to the second absolute value of the second rotor delta voltage and the remaining stator winding is proximal to the D-axis, nominally 120 degrees to the reference angle when a first absolute value of the first rotor delta voltage is greater than a second absolute value of the second rotor delta voltage and the remaining stator winding is proximal to the Q-axis, and nominally −60 degrees to the reference angle when the first absolute value of the first rotor delta voltage is less than or equal to the second absolute value of the second rotor delta voltage and the remaining stator winding is proximal to the Q-axis.

9. The method of claim 1 wherein the minimum absolute voltage corresponds to a W-Phase, the remaining stator winding is proximal to the D-axis when the respective stator delta voltage for a U-phase is greater than the respective stator voltage for a V-phase, and the remaining stator winding is proximal to the Q-axis when the respective stator delta voltage for a U-phase is less than or equal to the respective stator voltage for a V-phase.

10. The method of claim 9 wherein the initial position of the rotor is:

nominally −120 degrees to a reference angle when a first absolute value of the first rotor delta voltage is greater than a second absolute value of the second rotor delta voltage and the remaining stator winding is proximal to the D-axis, nominally 60 degrees to the reference angle when the first absolute value of the first rotor delta voltage is less than or equal to the second absolute value of the second rotor delta voltage and the remaining stator winding is proximal to the D-axis, nominally 150 degrees to the reference angle when a first absolute value of the first rotor delta voltage is greater than a second absolute value of the second rotor delta voltage and the remaining stator winding is proximal to the Q-axis, and nominally −30 degrees to the reference angle when the first absolute value of the first rotor delta voltage is less than or equal to the second absolute value of the second rotor delta voltage and the remaining stator winding is proximal to the Q-axis.

11. An apparatus comprising:

a rotor of an electric motor, the rotor comprising a Direct (D)-axis and a Quadrature (Q)-axis, wherein the D-axis defines a first path of maximum reluctance of the rotor and the Q-axis defines a second path of maximum generated torque; and a plurality of stator windings of the electric motor, wherein three pairs of stator windings are chosen from the plurality of stator windings; and a controller configured to:
  determine a delta voltage for each pair of stator windings by sequentially energizing and deenergizing each pair, wherein the delta voltage is measured through a non-energized stator winding connected to a center tap of each respective pair,
  determine a minimum delta voltage from a minimum of an absolute value of each of the three delta voltages, wherein the minimum delta voltage is associated with a remaining stator winding not included in the respective pair, and
  compare the two delta voltages not associated with the minimum delta voltage to determine the proximity of the remaining stator winding to one of the D-axis of the rotor and a Q-axis of the rotor.

12. The apparatus of claim 11 wherein the electric motor comprises a Permanent Magnet Synchronous Motor (PMSM).

13. The apparatus of claim 11 wherein the electric motor comprises a Brush Less Direct Current (BLDC) motor.

14. The apparatus of claim 11 wherein the controller is further configured to sequentially energize and deenergize a pair of stator windings including the remaining stator winding associated with the minimum delta voltage, to measure a first rotor delta voltage and a second rotor delta voltage, wherein a first rotor delta voltage is measured by applying a first voltage pulse in an opposing direction to a second voltage pulse used to measure a second rotor delta voltage, and determine a rotor polarity of the rotor by comparing the first rotor delta voltage with the second rotor delta voltage.

15. The apparatus of claim 11 wherein the controller is further configured to energize each pair of stator windings by sequentially connecting each pair to one of a power supply and a ground through a respective shorted diode connection.

16. A method for initial position detection of an electric motor comprising:

determining a delta voltage for each of three pairs of stator windings by sequentially energizing and deenergizing each pair, wherein the delta voltage is measured through a non-energized stator winding connected to a center tap of each respective pair;

determining a minimum delta voltage from a minimum of an absolute value of each of the three delta voltages, wherein the minimum delta voltage is associated with a remaining stator winding not included in the respective pair; and comparing the two delta voltages not associated with the minimum delta voltage to determine the proximity of the remaining stator winding to one of a Direct (D)-axis of a rotor of the electric motor and a Quadrature (Q)-axis of the rotor, wherein the D-axis defines a first path of maximum reluctance of the rotor and the Q-axis defines a second path of maximum generated torque.

17. The method of claim 16 further comprising sequentially energizing and deenergizing a pair of stator windings including the remaining stator winding associated with the minimum delta voltage, to measure a first rotor delta voltage and a second rotor delta voltage, wherein a first rotor delta voltage is measured by applying a first voltage pulse in an opposing direction to a second voltage pulse used to measure a second rotor delta voltage, and a rotor polarity of the rotor is determined by comparing the first rotor delta voltage with the second rotor delta voltage.

18. The method of claim 17 wherein the first voltage pulse and the second voltage pulse used to determine the rotor polarity have a long duration capable of magnetically saturating the remaining stator winding associated with the minimum delta voltage.

19. The method of claim 17 wherein the first voltage pulse and the second voltage pulse used to determine the rotor polarity have a short duration capable of preventing physical rotation of the rotor.

20. The method of claim 16 wherein energizing each of the three pairs of stator windings comprises connecting each respective pair to one of a power supply and a ground through a respective shorted diode connection.

* * * * *